United States Patent Office 3,144,562
Patented Aug. 11, 1964

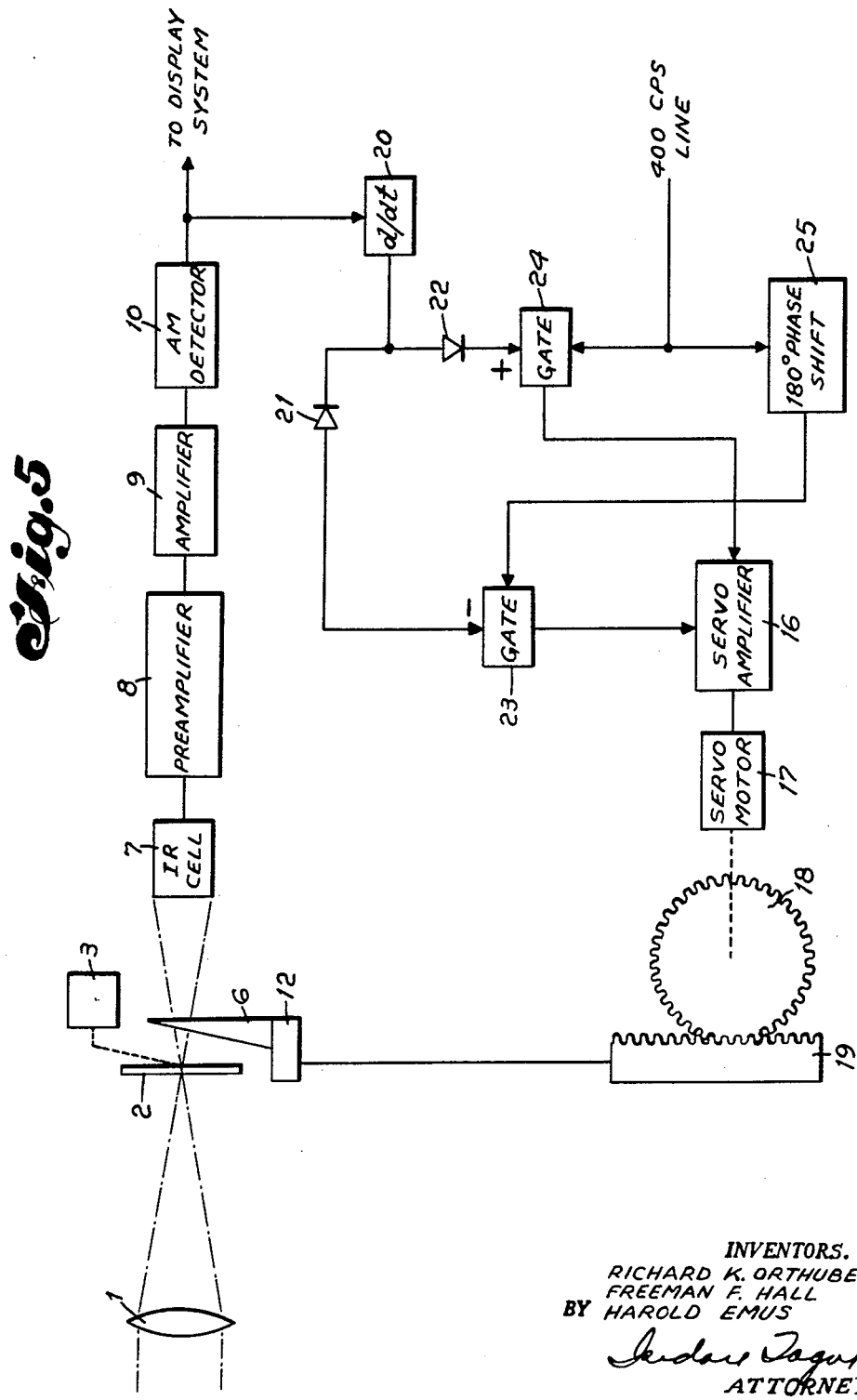

3,144,562
RADIATION SOURCE SEARCH SYSTEM USING
AN OSCILLATING FILTER
Richard K. Orthuber, Sepulveda, Freeman F. Hall, Granada Hills, and Harold Emus, Pacoima, Calif., assignors to International Telephone and Telegraph Corporation, Nutley, N.J., a corporation of Maryland
Filed May 12, 1961, Ser. No. 111,127
8 Claims. (Cl. 250—235)

This invention relates to infrared detection systems and more particularly to a detection system which affords improved discrimination between the source of radiant energy which is to be detected and the background against which the source is viewed.

The detection and tracking performance of infrared systems against thermally radiating targets is subject to limitations, mainly by two noise sources:

(1) Internal noise, such as detector or microphonic noise; and
(2) External noise or clutter noise caused by non-uniform radiance distribution in the background against which the target has to be observed.

Both types of noise prevent present-day systems from reaching the ultimate sensitivity limit set by photon noise. At this time, the second of the above-mentioned noise sources is the more serious under most practical conditions and it is more the exception than the rule that the system noise limited sensitivity as measured in dark tunnel tests can be reached or even closely approached against natural backgrounds. For this reason, the suppression of clutter noise has always been of considerable concern to the designers of infrared detection systems. In all such systems used heretofore, however, the range of detection has been seriously limited by the inability of the system to discriminate sufficiently between signals from the object being sought and spurious signals emanating from the background against which the scanning and detection system views the object.

The best known means to achieve this goal of discriminating true targets against backgrounds are based upon such distinguishing characteristics as high radiance and specific spectral composition of the emitted radiation. The first discrimination technique is usually referred to as "spatial" filtering and is performed by moving a finely divided reticle in the image plane of the infrared system, a procedure which can be shown to reduce clutter signals from the background without deteriorating the signal caused by a target subtending an angle smaller than the spacing of the reticle. Another known technique consists in chopping the received radiation by means of "two color" reticles which result in a chopping action dependent on the spectral composition of the radiation. The latter technique in its present form has the disadvantage in that it is fully effective only against backgrounds of a certain known and invariable spectral composition.

It is an object of this invention accordingly to provide a detection system which will permit automatic spectral adjustment of an infrared system using two color chopping and thus achieve optimum suppression of background signals from sources with insufficiently known and variable spectral composition.

A feature of this invention is an infrared detection system for locating the source of radiation comprising means to receive a mixture of radiations including the source radiations and other radiations which may be reflected sunlight or thermally emitted background clutter, the source radiations lying within the frequency range of the reflected sunlight and ground clutter. First filter means coupled to the receiver pass some of the background radiations and also the source radiations and a second variable filter means is disposed adjacent the first filter means. Means responsive to the output of the first and second filter means detect the radiations and means are further provided coupled to the output of the detection means to change the position of the second filter relative the first filter to attenuate the background radiations and thus minimize the unwanted radiations other than the source radiations.

The above-mentioned and other features and objects of this invention will become more apparent by reference to the following description taken in conjunction with the accompanying drawings, in which:

FIG. 4 is a block diagram of one embodiment of this invention;

FIG. 5 is a block diagram of a second embodiment of this invention; and

Figure 1:
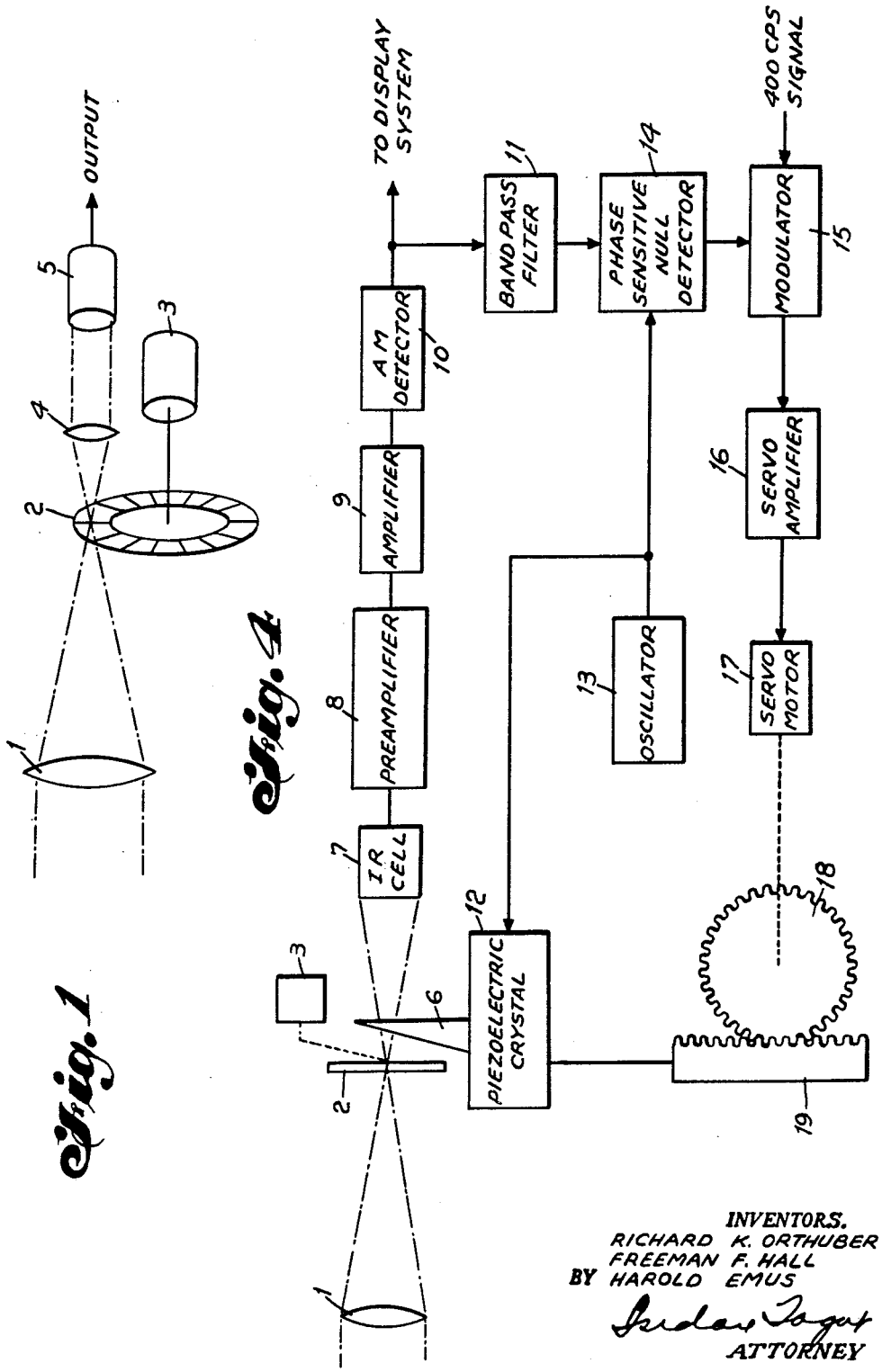
FIG. 1 is a basic configuration of an infrared detection system.

To illustrate the present state of the art of two color chopping in infrared detection systems, refer to FIGURE 1 which shows a very basic and simplified configuration of an infrared detection system. This system contains imaging optics including a lens 1, a chopping means 2 in the image plane of lens 1 and driven by a motor 3, a relay lens 4 and a radiation detector 5 responsive to radiation passed through the optical system described and which will feed electrical signals into a following preamplifier (not shown). The chopping means 2 may, for instance, consist of a rotating circular disk with alternating opaque and transmissive spokes applied to it. The actual configuration of this chopping pattern which might vary depending upon the application of this system is, however, not important. Similarly, it is irrelevant for purpose of the discussion, if, instead of moving the chopping pattern, the chopping means 2 is kept stationary with respect to the optical system and chopping is achieved by sweeping the image field and the target image across the stationary chopping pattern. As stated above, for discrimination against clutter signals, it is advisable to choose the chopping pattern as fine as the resolution of the imaging optics permits (space filtering). This method is rarely sufficient to reduce the clutter noise level below the internal system noise and it is then necessary to utilize other characteristics distinguishing true target and background signals for further discrimination. If the target to be detected is an aircraft or missile in powered flight, the most prominent source of radiation is its motor or exhaust and, in this very important case, the spectral distribution of the target emission will be a valuable characteristic distinguishing the true target from the background. This follows from the fact that the predominant sources of clutter signals are either objects reflecting or scattering sunlight with a color temperature of 5800° K. (particularly, clouds and water surfaces) or objects near ambient temperature radiating approximately with the distribution of a 300° K. black body, whereas jet and rocket exhausts correspond to temperatures between 800° K. and 1500° K. For this reason, it is customary in infrared detection and tracking systems of aircraft or missiles in powered flight to select detectors sensitive around the spectral peak of the target radiation and to provide spectral filters in the optical path which are opaque for wavelength around the spectral peaks of the background radiation. This measure, though useful and in common usage, is however only partially effective for the reason that the spectral distributions of the true target and the background target show considerable overlapping. For this reason, the method of two color chopping has been proposed and has found actual application. This method is illustrated in FIG. 2, for the case that the clutter signals are originating from a black or gray source at 300° K.

Figure 2:
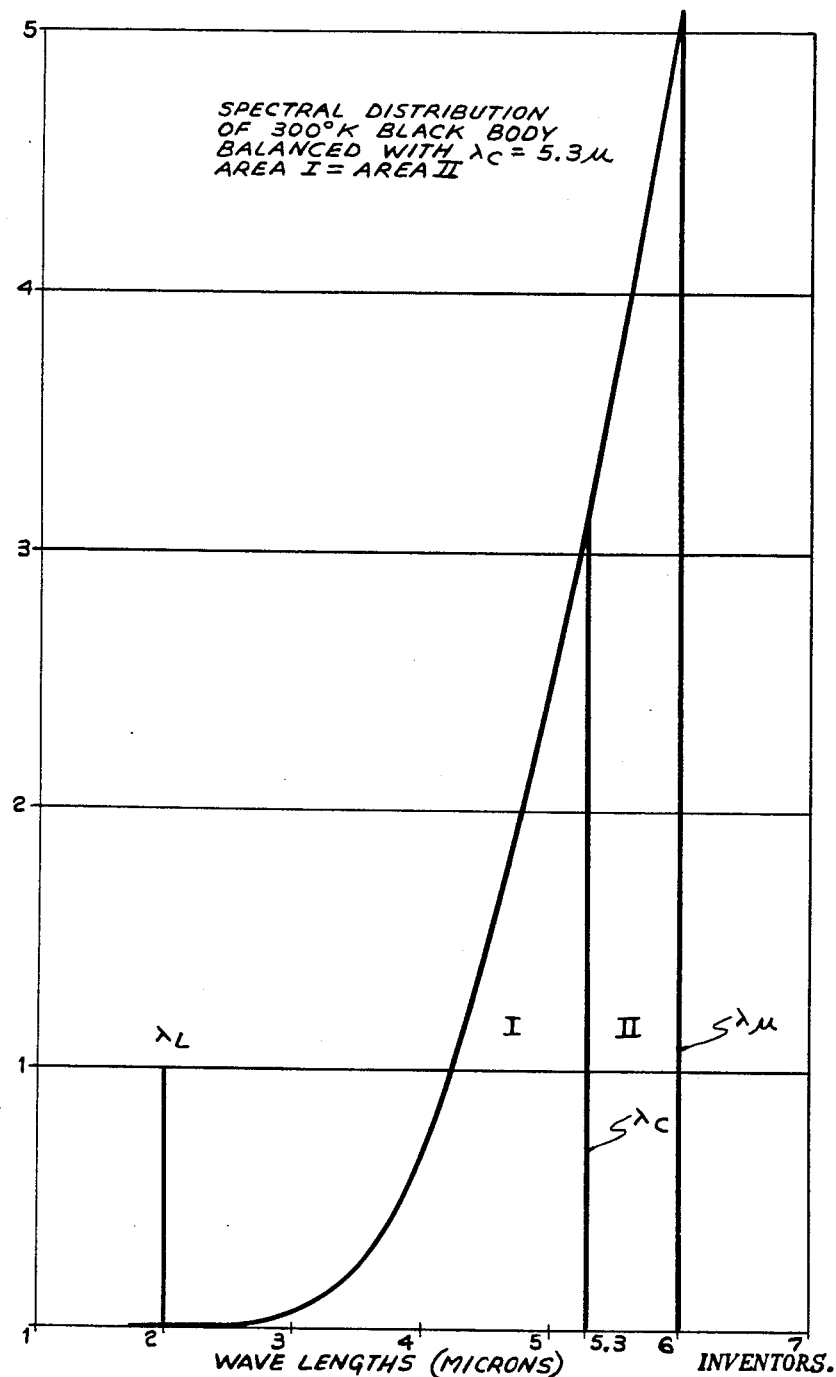
FIG. 2 is a graph illustrating the spectral distribution of 300° K. black body.

In FIGURE 2 the spectral radiance, i.e. the radiant power per unit spectral bandwidth emitted into unit solid angle from unit area of the 300° K. body is plotted versus the wavelength between and upper and lower cutoff wavelength $\lambda_u$ and $\lambda_L$. Those limits are in an actual case determined by the transmission properties of the applied optical system which may contain a fixed filter and the spectral response characteristic of the detector. In FIGURE 2 they are assumed at 2 microns and 6 microns respectively.

In conventional chopping with a reticle consisting of alternately opaque and transmissive elements the entire radiation in this spectral band is modulated 100%.

In two-color chopping the alternately opaque and transmissive areas are replaced by alternating areas 1 and 11, such that area 1 is transmissive between $\lambda_L$ and $\lambda_C$ and area 11 between $\lambda_C$ and $\lambda_u$ where $\lambda_C$ is a crossover wavelength between $\lambda_L$ and $\lambda_u$. If this wavelength is chosen so that $$\int_{\lambda_L}^{\lambda_c} S\lambda d\lambda = \int_{\lambda_c}^{\lambda_u} S\lambda d\lambda \quad (1)$$

radiation with a distribution $S_\lambda$ will not be chopped and thus produce no A.C. signal.

The above assumption of sharp cutoffs at $\lambda_L$, $\lambda_c$ and $\lambda_u$ and also the implication of flat detector response and optical transmission in the imaging system have been made for the purpose of simplification and are not crucial for the functioning of the two-color chopping scheme. More generally the conditions for achievement of background suppression without the above assumption may be formulated as follows:

$$\int_{\lambda_L}^{\lambda_c} S_B(\lambda)R(\lambda)T_I(\lambda)d\lambda = \int_{\lambda_c}^{\lambda_u} S_B(\lambda)R(\lambda)T_{II}(\lambda)d\lambda \quad (2)$$

and $$\int_{\lambda_L}^{\lambda_c} S_T(\lambda)R(\lambda)T_I(\lambda)d\lambda \underset{\gg}{\ll} \int_{\lambda_c}^{\lambda_u} S_T(\lambda)R(\lambda)T_{II}(\lambda)d\lambda \quad (3)$$

where $S_B(\lambda)$ and $S_T(\lambda)$ are the spectral distributions of clutter sources and target respectively, $R(\lambda)$ the spectral response of the detector, $T_0(\lambda)$, $T_I(\lambda)$ and $T_{II}(\lambda)$ the spectral transmissions of the optical system and the chopper areas I and II respectively and $\lambda_L$ and $\lambda_u$ the not necessarily well defined wavelengths beyond which the system loses its response.

The main shortcoming of the above outlined two-color chopping method consists in the fact that a specific chopping element with transmission characteristics $T_I(\lambda)$ and $T_{II}(\lambda)$ is perfectly effective only for a specific set of radiation distributions and in the case of a black or gray clutter source only for sources of a specific temperature.

Clutter sources deviating from this design temperature $T_R$ will not be suppressed completely and produce residual signals increasing with this deviation.

Figure 3:
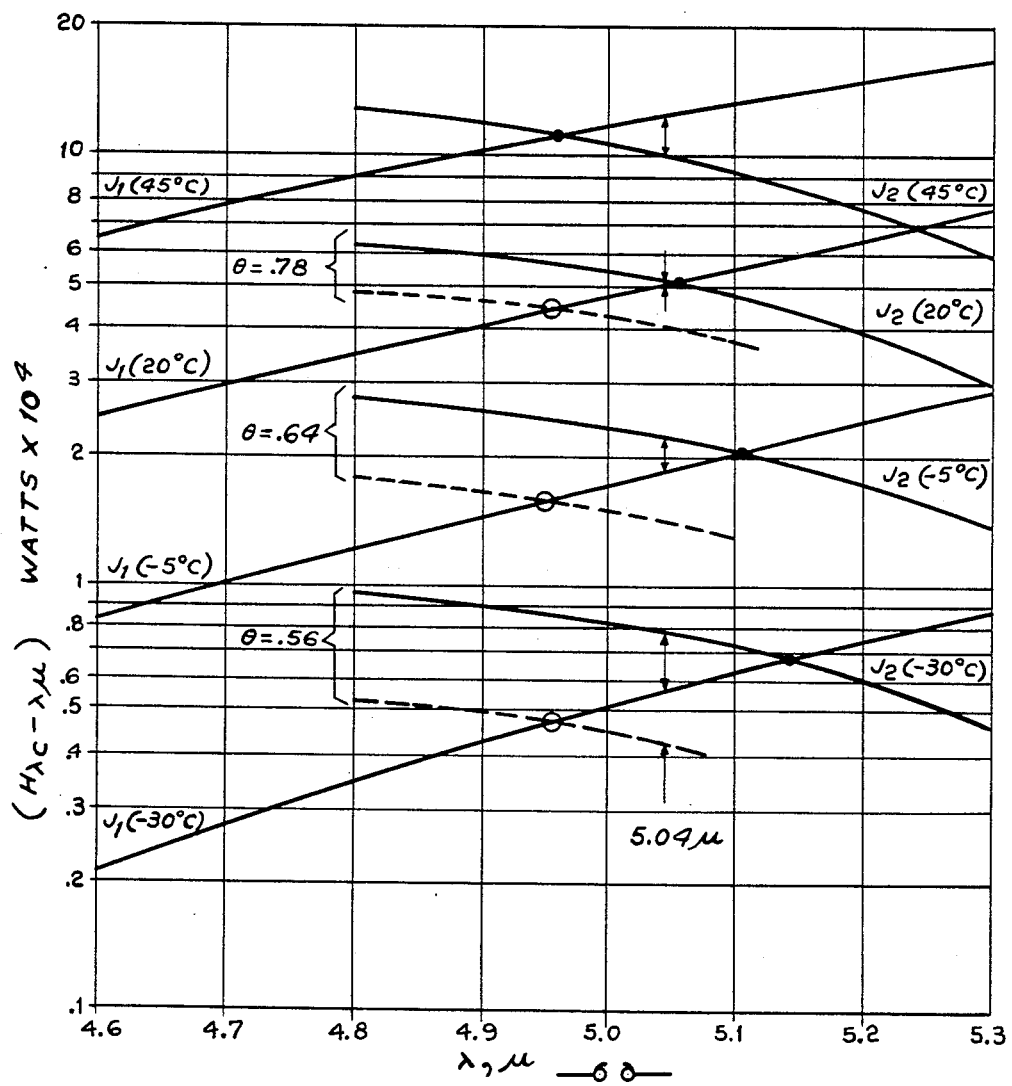
FIG. 3 is a graph useful in explaining the operation of this invention.

Those residual signals can be read directly from FIGURE 3 which shows in arbitrary units the integrals $J_1$ and $J_2$ (left and right side of Equation 2) as a function of $\lambda_c$ for different values of the clutter suorce temperature. At the intersection points of $J_1$ and $J_2$ for the same temperature the integrated flux through both areas 1 and 11 is identical and the chopper is balanced. Thus the abscissa of those points indicates the crossover wavelength $\lambda_c$ of the two-color chopping required to suppress clutter of a given temperature.

In FIGURE 3 the chopper is balanced for 20° C. radiation with a crossover wavelength of 5.04 micron. For radiations of differing temperature the same chopper will, however, produce clutter signals with an amplitude indicated by the length of the arrows in the figure.

For temperature deviations of ±25° from the design temperature this residual signal corresponds to approximately 15% of the clutter signal which would be obtained from a conventional black and white reticle.

It is fairly obvious that in actual applications it will become necessary to operate in a wider range of background temperatures and even in a single scan of an IR system background temperatures of a larger spread may be encountered.

Thus the practical value of the described two-color background suppression scheme is rather limited.

The purpose of this invention is to remedy the lack of flexibility of the above-described two color background suppression method by adding to the conventional two color chopping equipment means which permit continuous and automatic adjustment of the spectral balance of the two color chopping system to variations in the spectral distribution of the background in order to achieve maximum background suppression in spite of such variations. It has been shown in FIG. 3 that an increase in background temperature required a shift of the crossover wavelength to smaller values and vice versa. It is not feasible to vary either one or both of the transmission characteristics of the filter elements constituting the two color chopper.

This invention provides an additional spectral filter which is inserted in the optical path and has spectral transmission characteristics such that it attenuates to different degrees the background radiation transmitted by two kinds of elements forming the associated two-color chopper. The attenuation effected by this adjusting filter is dependent on its orientation or depth of insertion in the optical path which is varied as described below.

This adjusting filter may, as an example, have transmission characteristics similar to the Type I filter areas of the two-color chopper. Then it is transmissive at wavelengths shorter than $\lambda_c$ and opaque for $\lambda > \lambda_c$. Insertion of such a filter into the optical path to variable depths will therefore effect an adjustable depression of the $J_2$ curves in FIGURE 3 and for any clutter temperature a position may be found which produces a crossover wavelength equal to that of the fixed two-color reticle. FIGURE 3 illustrates the case, where a two-color reticle having a crossover wavelength of 4.96 microns and thus balanced for 45° C. radiation may be balanced for temperatures down to (−30° C.) by variable insertion of an adjusting filter having the characteristics of the type I filter such that the transmission above $\lambda_c$ is reduced to values varying between $\theta = 1$ and $\theta = .56$. Of course it is also possible to design the two-color chopper for balance at the lowest expected clutter temperature and to introduce adjustable attenuation below the chopper crossover wavelength.

Which method is preferable depends on the spectral distribution of the target and the adjusting attenuation should not be carried out in the spectral band where the target radiation is concentrated. In the practically important case of detection of jet exhausts the target radiation is virtually completely contained below 5 microns and therefore the chopper illustrated in FIGURE 3 is adjusted preferentially by attenuation of the longer wave band.

Since the value of $J_1$ and $J_2$ depends on the lower and upper cutoff wavelengths respectively it is also possible to adjust the two-color chopper for balance at different clutter temperatures by insertion of filters affecting either one of the above cutoff wavelengths. This will lead to somewhat different shapes of the $J_1$ and $J_2$ curves of FIGURE 3 but not influence the basic operation of the automatic background rejector scheme.

Referring now to FIG. 4, there is shown in a preferred embodiment of this invention, a lens 1 and a two-color chopper 2 driven by a motor 3. Disposed adjacent to the chopper 2 and in the optical path, there is disposed a spectral filter 6, which is shown in the form of a wedge which might be a fused silica or other material having the required spectral distinction characteristics. Infrared detection cell 7 is disposed in the optical path responsive to the received radiation. The output of the infrared cell 7 is coupled to preamplifier 8, which in turn is coupled to an amplifier 9. The output of the amplifier 9 is coupled to an amplitude modulation detector 10, the output of which is the desired information that is fed to a display system (not shown). The output of the AM detector 10 is also coupled to a bandpass filter 11. The filter 6 is mounted on a dithering device such as a piezoelectric crystal 12 to which is coupled the output of an oscillation 13 which may have a frequency of the order of 10 to 100 c.p.s. as may be desired. The crystal vibrations produced by the signal from the oscillator 13 cause the filter 6 to penetrate more or less deeply into the optical path cross section. The crystal 12 in this way gives the filter a slight dithering motion about its steady state position. The output of the oscillator 13 and bandpass filter 11 is coupled to a phase sensitive null detector 14. The output of the phase sensitive detector 14 is coupled to a modulator 15 to which is also coupled a 400 c.p.s. signal. It is to be understood however, that the choice of this frequency is optional and any other suitable frequency may be used. The output of the modulator 15 is fed into a servo amplifier 16 which in turn energizes a servo motor 17 that drives a rack and pinion gear 18 and 19. The rack 19 is coupled to the crystal 12 to control the steady state position of the crystal 12. The modulation of the background noise due to the dithering motion imparted to the crystal 12 is picked up by the infrared cell 7, transmitted through the preamplifier 8 and amplifier 9 and detected in the detector 10. The bandpass filter 11 picks off the frequencies of interest and feeds them to the phase sensitive null detector 14 to which is also fed the reference signal of the oscillator 13. The phase detector output controls the modulator 15, the output of which energizes the servo motor 17 controlling the steady state position of the filter 6. At the null position though there is modulation due to the dithering motion, the phase detector gives zero output and the servo rests at null.

Figure 6:
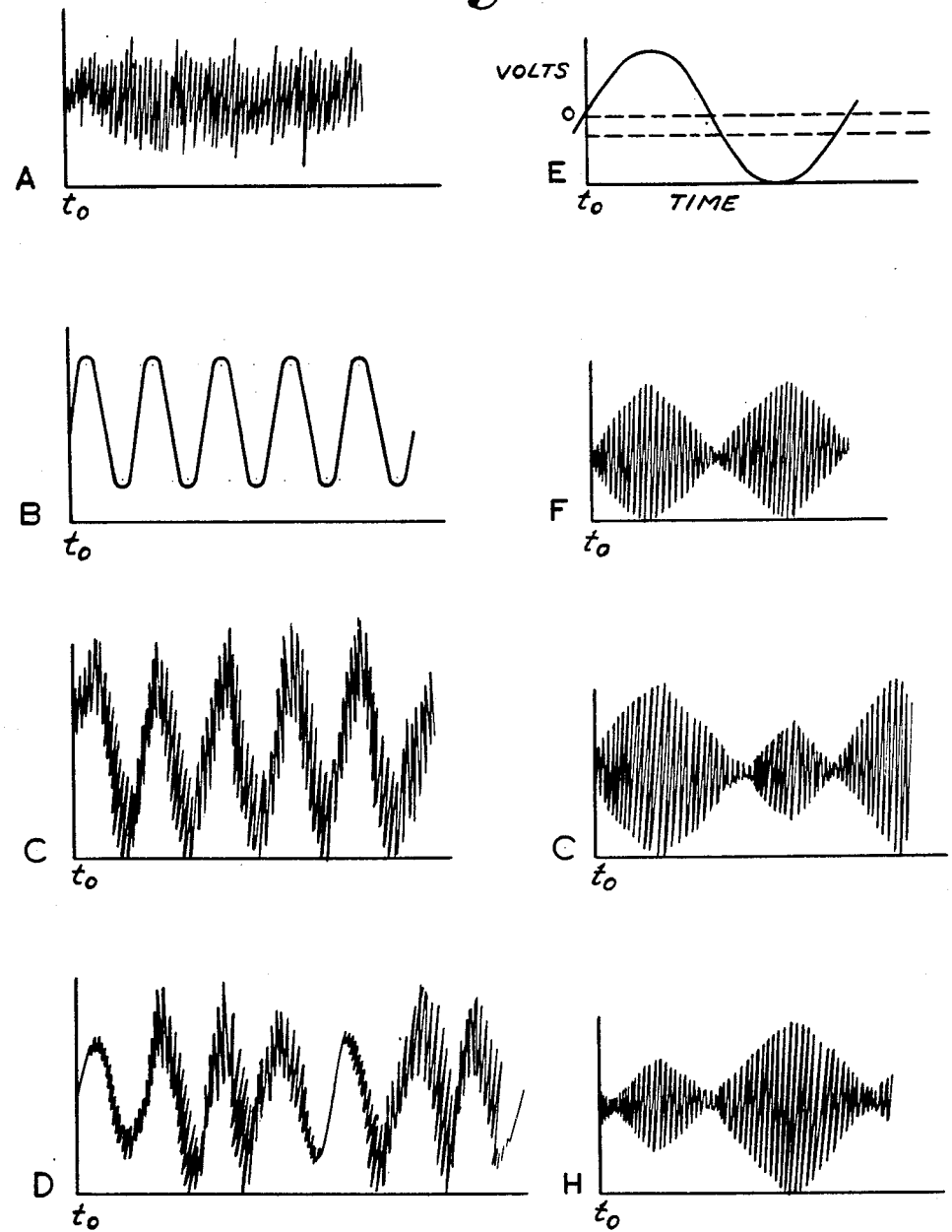
FIG. 6 is a graph of waveforms useful in explaining the operation of this invention.

The operation of the servo system can be more clearly described with reference to the waves of FIG. 6. Wave A, FIG. 6, indicates the random noise due to the background conditions and as seen at the entrance aperture of the system will have a given power spectrum such as "white" noise. Wave B is an idealized presentation of the signal alone after chopping which is sinusoidal at the chopping frequency. However, there will be background noise riding upon the signal and even for relatively high signal-to-noise ratio, the noise and signal after chopping will appear as shown in waveform C. If the spectral balancing filter 6 is is oscillated about its ideal null position, the noise and signal after chopping will have an appearance similar to that shown in wave D which indicates that each time the null position is reached, the noise level drops significantly but at the ends of the filter 6 excursion, the noise again becomes appreciable with respect to the signal. The frequency with which the spectral balancing filter is oscillated, in this case 100 c.p.s., will be a small fraction of the signal chopping frequency so that it will be possible to separate the noise envelope from the signal by suitable filters. Waveform E illustrates the reference voltage output of oscillator 13. When this voltage is at zero, the filter 6 is undergoing no acceleration in or out of the radiation pencil. Let it be assumed that for a given background condition the filter is positioned so that optimum balance is obtained when no driving voltage is present; then waveform F illustrates the noise envelope where the noise nulls are in phase with the nulls of the reference voltage. However, if the filter is inserted too far into the beam for the zero reference voltage, there will be already a considerable noise at this point and it will rise as the amount of insertion increases so that the noise signal will appear as in waveform G. It should be noted here that the noise maxima correspond in phase with a maximum or minimum in the reference voltage, but that the null positions now suffer a phase shift with respect to the nulls of the reference voltage. Conversely, if the filter is not inserted far enough at the zero reference voltage position, slightly more insertion will lead to spectral balance so that the noise envelope will have the form shown in wave H. Here again the maxima of the curve corresponds with the maxima or minima at the reference voltage but the null wave shift is in the opposite direction from the previously mentioned case above. Thus, the envelope of the noise does not shift in phase, but only the null points of the envelope and the phase relationship between the null position in the noise envelope and that in the reference voltage is evaluated in the phase sensitive null detector and indicate in which direction the average filter position must be shifted to minimize the clutter output.

A second embodiment of this invention is shown in FIG. 5. Here the servo system itself is continually jittering about the desired position. The output of the AM detector 10 is coupled to a differentiator 20. The output of differentiator 20 is coupled to oppositely poled diodes 21 and 22, the outputs of which are fed respectively to the gates 23 and 24. The 400 c.p.s. signal is coupled directly to gate 24 and after being phase shifted 180° in phase shifter 25 is coupled to gate 23. The outputs of gates 23 and 24 are coupled to the servo amplifier 16. The servo motor 17 is continually energized, the phase of activation being controlled by the output of differentiator 20. In this embodiment the operation depends on the fact that the clutter signal increases as the filter 6 moves away from the null position in either direction. As the clutter signal is amplified, detected and differentiated, the differentiator 20 output is positive or negative dependent on whether the filter 6 is moving away from or towards the null. The function of the piezoelectric crystal 12 is identical to that of the crystal 12 in FIG. 4, that is, to dither or jitter the filter 6.

While we have described above the principles of our invention in connection with specific apparatus, it is to be clearly understood that this description is made only by way of example and not as a limitation to the scope of our invention as set forth in the objects thereof and in the accompanying claims.

We claim:

1. A detection system for locating a source of radiations comprising means to receive a mixture of radiations including said source radiations and other undesired radiations, said source radiations being within the frequency range of said undesired radiations, first filter means to pass some of said mixture of radiations including said source radiations, second variable spectral filter means disposed adjacent said first filter means, means to oscillate said second spectral filter means transverse to the axis of said receiving means in a constant dithering motion to modulate said radiations, means responsive to the output of said first and second filter means said output including said radiations and said modulations to detect said radiations and said modulations and means coupled to the modulation output of said detection means to change the position of said second filter means relative said axis to attenuate said undesired radiations.

2. A detection system for locating a source of radiations comprising means to receive a mixture of radiations including said source radiations and other undesired radiations, said source radiations being within the frequency range of said undesired radiations, first filter means to pass some of said mixture of radiations including said source radiations, second variable spectral filter means disposed adjacent said first filter means, a source of low frequency oscillations, means coupled to said source of low frequency oscillations to oscillate said second spectral filter means transverse to the axis of said receiving means in a constant dithering motion to modulate said radiations, means coupled to said source of low frequency oscillations, means responsive to the output of said first and second filter means to detect said radiations and said low frequency modulations, means to compare the output of said source of low frequency oscillations and said detected low frequency modulations, and means responsive to the output of said comparing means to change the position of said second filter means relative said axis to attenuate said undesired radiations.

3. A detection system for locating a source of radiations comprising means to receive a mixture of radiations including said source radiations and other undesired radiations, said source radiations being within the frequency range of said undesired radiations, first filter means to pass some of said mixture of radiations including said source radiations, a second variable filter disposed on the optical axis of said detection system, crystal means supporting said second filter, a source of low frequency oscillations, means coupling said source of low frequency oscillations to said crystal whereby said crystal oscillates said second filter about a steady state position of said second filter and transversely to said optical axis to modulate said radiations, an infrared sensitive device responsive to the output of said first and second filter means, said output including said source radiations and said low frequency modulations, means to detect said low frequency modulations, a phase comparing means, means coupling the outputs of said source of low frequency oscillations and said detecting means to said phase comparing means, servo means coupled to said crystal means and responsive to the output of said comparing means to actuate said crystal whereby the steady state position of said second filter with respect to said optical axis changes in response to the output of said phase comparing means to attenuate said undesired radiations.

4. A detection system for locating a source of radiations comprising means to receive a mixture of radiations including said source radiations and other undesired radiations, said source radiations being within the frequency range of said undesired radiations, first filter means to pass some of said mixture of radiations including said source radiations, a second variable filter movably disposed in the optical axis of said detection system to produce varying steady state positions of said varaible filter, piezoelectric crystal means supporting said second filter, a source of first low frequency oscillations, means coupling said source of low frequency oscillations to said crystal whereby said crystal oscillates said second filter about a steady state position of said second filter and transversely to said optical axis to modulate said radiations, an infrared sensitive device responsive to the output of said first and second filter means, said output including said radiations and said low frequency modulations, means to detect said low frequency modulations, a phase sensitive null detector, means coupling the outputs of said source of low frequency oscillations and said detecting means to said phase sensitive null detector, a source of second oscillations, a modulator, means coupling said second oscillations and the output of said phase sensitive null detector to said modulator whereby there is derived an output from said modulator when there is an output signal from said phase sensitive null detector, a servo motor, amplifier means coupling the output of said modulator to said servo motor, means coupling said servo motor to said piezoelectric crystal whereby the steady state position of said second filter with respect to said optical axis changes in response to the output of said phase sensitive null detector to attenuate said undesired radiations.

5. A detection system for locating a source of radiations comprising means to receive a mixture of radiations including said source radiations and other undesired radiations, said source radiations being within the frequency range of said undesired radiations, first filter means to pass some of said mixture of radiations including said source radiations, a second variable filter movably disposed on the optical axis of said detection system to produce varying steady state positions of said variable filter, piezoelectric crystal means supporting said second filter, a source of first low frequency oscillations, means coupling said source of low frequency oscillations to said crystal whereby said crystal oscillates said second filter about a steady state position of said second filter and transversely to said optical axis to modulate said radiations, an infrared sensitive device responsive to the output of said first and second filter means said output including said radiations and said low frequency oscillations, an amplitude modulation detector, amplifier means coupling the output of said infrared detection device to said amplitude modulation detector, a filter to pass the detected low frequency oscillations, a phase sensitive null detector, means coupling the outputs of said source of first low frequency oscillations and said filter to said phase sensitive null detector, a source of second oscillations, a modulator, means coupling said second oscillations and the output of said phase sensitive null detector to said modulator whereby there is derived an output from said modulator when there is an output signal from said phase sensitive null detector, a servo motor, amplifier means coupling the output of said modulator to said servo motor, means coupling said servo motor to said piezoelectric crystal whereby the steady state position of said second filter with respect to said optical axis changes in response to the output of said phase sensitive null detector to attenuate said undesired radiations.

6. A detection system for locating a source of radiations comprising means to receive a mixture of radiations including said source radiations and other undesired radiations, said source radiations being within the frequency range of said undesired radiations, first filter means to pass some of said mixture of radiations including said source radiations, a second variable filter movably disposed on the optical axis of said detection system to produce varying steady state positions of said variable filter, piezoelectric crystal means supporting said second filter, a source of first low frequency oscillations, means coupling said source of low frequency oscillations to said crystal whereby said crystal oscillates said second filter about a steady state position of said second filter and transversely to said optical axis to modulate said radiations, an infrared sensitive device responsive to the output of said first and second filter means said output including said radiations and said low frequency oscillations, an amplitude modulation detector, amplifier means coupling the output of said infrared detection device to said amplitude modulation detector, a filter to pass the detected low frequency oscillations, a phase sensitive null detector, means coupling the outputs of said low frequency oscillator and said filter to said phase sensitive null detector, a source of second oscillations, a modulator, means coupling said second oscillations and the output of said phase sensitive null detector to said modulator whereby there is derived an output from said modulator when there is an output signal from said phase sensitive null detector, a servo motor, amplifier means coupling the output of said modulator to said servo motor, a rack and gear arrangement coupling the output of said servo motor to said piezoelectric crystal whereby the steady state position of said second filter with respect to said optical axis changes in response to the output of said phase sensitive null detector to attenuate said undesired radiations.

7. An infrared detection system for locating a source of radiations comprising means to receive a mixture of radiations including said source radiations and other undesired radiations, said source radiations being within the frequency range of said undesired radiations, first filter means to pass some of said mixture of radiations including said source radiations, a second filter in the form of a wedge movably disposed on the optical axis of said detection system to produce varying steady state position of said second filter and transversely to, piezoelectric crystal means supporting said second filter, a source of first low frequency oscillations, means coupling said source of low frequency oscillations to said crystal whereby said crystal oscillates said second filter about a steady state position of said second filter and transversely to said optical axis to modulate said radiation, an infrared sensitive device responsive to the output of said first and second filter means said output including said radiations and said low frequency oscillations, an amplitude modulation detector, amplifier means coupling the output of said infrared detection device to said amplitude modulation detector, a filter to pass the detected low frequency oscillations, a phase sensitive null detector, means coupling the outputs of said source of low frequency oscillations and said filter to said phase sensitive null detector, a source of second oscillations, a modulator, means coupling said second oscillations and the output of said phase sensitive null detector to said modulator whereby there is derived an output from said modulator when there is an output signal from said phase sensitive null detector, a servo motor, amplifier means coupling the output of said modulator to said servo motor, a rack and gear arrangement coupling the output of said servo motor to said piezoelectric crystal whereby the steady state position of said second filter with respect to said optical axis changes in response to the output of said phase sensitive null detector to attenuate said undesired radiations.

8. A detection system for locating a source of radiations comprising means to receive a mixture of radiations including said source radiations and other undesired radiations, said source radiations being within the frequency range of said undesired radiations, first filter means to pass some of said mixture of radiations including said source radiations, a second filter in the form of a wedge movably disposed on the optical axis of said detection system to produce varying steady state positions of said variable filter, piezoelectric crystal means supporting said second filter, an infrared sensitive device responsive to the output of said first and second filter means, an amplitude modulation detector, amplifier means coupling the output of said infrared detection device to said amplitude modulation detector, a differentiator, means coupling the output of said detector to said differentiator, first and second diodes, means coupling the output of said differentiator to the cathode of said first diode and the anode of said second diode, first and second gating circuits, means coupling the anode of said first diode to said first gating circuit, means coupling the cathode of said second diode to said second gating circuit, a source of oscillations, a 180° phase shifter, means coupling said source of oscillations to said second gating circuit and to said phase shifter, means coupling the output of said phase shifter to said first gating circuit, a servo motor, amplifier means coupling the outputs of said gating circuits to said servo motor to drive said motor in a direction determined by the output of that gating circuit caused to operate by the output of said differentiator, a rack and gear arrangement coupling the output of said servo motor to said piezoelectric crystal whereby said second filter oscillates with respect to said optical axis and changes its steady state position in response to the output of said differentiator to attenuate said undesired radiations.

References Cited in the file of this patent
UNITED STATES PATENTS

| | | |
|---|---|---|
| 1,918,827 | Rogan | July 18, 1933 |
| 1,999,646 | Wittkuhns | Apr. 30, 1935 |
| 2,076,553 | Drinker et al. | Apr. 13, 1937 |
| 2,385,085 | Fabin | Sept. 18, 1945 |
| 2,418,964 | Arenberg | Apr. 15, 1947 |
| 2,503,808 | Earl et al. | Apr. 11, 1950 |
| 2,540,827 | Mankin | Feb. 6, 1951 |
| 2,775,160 | Foskett et al. | Dec. 25, 1956 |
| 3,009,065 | McKnight et al. | Nov. 14, 1961 |
| 3,039,353 | Coates et al. | June 19, 1962 |